United States Patent

Lindsey et al.

[15] 3,676,399

[45] July 11, 1972

[54] POLYBENZOXAZOLE AMIDES, ESTERS AND THIOESTERS, POLYBENZTHIAZOLE AMIDES, ESTERS AND, THIOESTERS AND PREPARATION THEREOF

[72] Inventors: Alan Sidney Lindsey; Sydney Edwin Hunt, both of Teddington, England

[73] Assignee: National Research Development Corporation, London, England

[22] Filed: Nov. 17, 1971

[21] Appl. No.: 199,800

Related U.S. Application Data

[63] Continuation-in-part of Ser. No. 800,251, Feb. 18, 1969, abandoned.

[30] Foreign Application Priority Data

Feb. 22, 1968 Great Britain..........................8,684/68

[52] U.S. Cl.....................260/47 CP, 117/124 E, 117/132 B, 260/30.8 DS, 260/32.2, 260/32.6 N, 260/65, 260/78 TF, 260/78.4 R, 260/78.4 E, 260/79
[51] Int. Cl........................................................C08g 33/02
[58] Field of Search................260/47 CP, 78 TF, 49, 78.4 R, 260/79; 117/65

[56] References Cited

UNITED STATES PATENTS

| | | | |
|---|---|---|---|
| 3,230,196 | 1/1966 | Moyer | 260/47 |
| 3,424,720 | 1/1969 | Rudner et al. | 260/47 |
| 3,449,296 | 6/1969 | Angelo et al. | 260/47 |

*Primary Examiner*—William H. Short
*Assistant Examiner*—L. L. Lee

[57] ABSTRACT

The invention comprises an aromatic polyamide polymer having oxy-or thio- groups in ortho or peri relationship to the amide structural units which can be cyclised to form benzoxazole or benzthiazole structural units by heating, and —CONH—, CO.O— or —CO.S— structural units which are not able to cyclise at the temperature at which the benzoxazole or benzthiazole units are formed. Such a polymer is prepared by reacting [A] 9 polybasic carboxylic aromatic acid or a functional derivative thereof, with [B] a bis o-amino thiophenol or a functional derivative thereof, with [B] a bis o-amino phenol or a bis o-amino thiophenol or a functional derivative thereof and [c] a third component of formula:

$$X — Ar— Z Z$$

where X and Z are the same or different and represent a hydroxyl, amino or thiol group, and Ar represents an aromatic group such that X and Z are not in ortho or peri relationship.

31 Claims, No Drawings

POLYBENZOXAZOLE AMIDES, ESTERS AND THIOESTERS, POLYBENZTHIAZOLE AMIDES, ESTERS AND, THIOESTERS AND PREPARATION THEREOF

This application is a continuation-in-part of our earlier filed application Ser. No. 800251 filed Feb. 18, 1969 and now abandoned.

This invention relates to polymers and more particularly to polyamides.

It has been proposed to produce polymers containing benzoxazole units by heating a polyhydroxy polyamide to above 200° to eliminate water and effect cyclization.

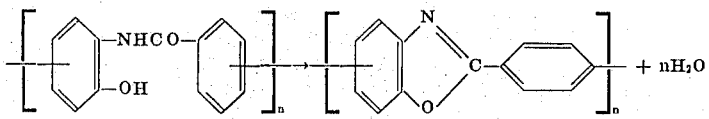

However, if shaped articles are treated in this way, the water, which is liberated as steam, tends to disrupt the shaped article and to form voids, dislocations, blowholes, and other faults leading to a reduction in mechanical and structural properties.

A novel polyamide has now been developed having improved properties in this respect.

The present invention comprises an aromatic polyamide polymer having oxy- or thio- groups in ortho or peri relationship to the amide structural units which can be cyclized to form benzoxazole or benzthiazole structural units by heating, and —CONH—, —CO.O— or —CO.S— structural units which are not able to cyclize at the temperature at which the benzoxazole or benzthiazole units are formed.

Also included within the invention is a process for the production of a polymer which comprises reacting [A] a polybasic carboxylic aromatic acid or a functional derivative thereof, with [B] a bis o-amino phenol, a bis o-amino thiophenol, or a functional derivative thereof, and [C] a third component of formula:

$$X - Ar - Z$$

where X and Z are the same or different and represent a hydroxyl, amino or thiol group, and Ar represents an aromatic group such that X and Z are not in ortho or peri relationship.

The percentage of non-cyclizable —CONH—, —CO.O— or —CO.S— structural units present in the polymer can be varied, for example, by altering the relative proportions of the monomers, but preferably there are from 5 to 75 percent of non-cyclizable —CONH—, —CO.O—, or —CO.S— structural units present in the polymer, based on the total number of structural units present.

The invention also includes a process of heating the polymer to form benzoxazole or benzthiazole structural units along the polymer chain, and a polymer containing benzoxazole or benzthiazole structural units produced therefrom.

Suitable temperatures for the formation of benzoxazole or benzthiazole units by cyclization range from about 200°C to about 500°C, particularly from 250°C to 450°C, for example 300°C.

The polybasic aromatic carboxylic acid component can be a substituted or unsubstituted mono- or polycyclic, dibasic, tribasic or tetrabasic acid, but is preferably a dibasic acid such as, for example, an acid in which the carboxyl groups are attached to a —$C_6H_4$—, —$C_6H_4$—O—$C_6$—$H_4$ or —$C_6H_4$—$SO_2$—$C_6H_4$ radical.

Derivatives of polybasic aromatic acids which can be used include acid halides e.g. acid chlorides, esters e.g. alkyl or phenyl esters, internal anhydrides or mixed anhydrides with other acids e.g. with lower aliphatic acids such as acetic acid. Particular examples of suitable polybasic acid derivatives include isophthaloyl dichloride, terephthaloyl dichloride, 4,4' dichloroformyl diphenyl ether, 4,4' dichloroformyl diphenyl sulphone, 4,4' dichloroformyl benzophenone, pyromellitic acid dianhydride, trimellitic acid dianhydride and diphenyl isophthallate.

The preferred bis o-amino phenols or bis o-amino thiophenols or functional derivatives thereof for use in the process of the invention have the general formulas:

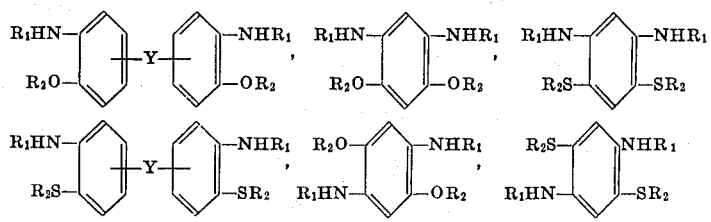

where Y represents a carbon-carbon bond, or a bridging group that is —O—, —S—, —$SO_2$—, $$>C=O,$$

—CONH—, —COO—, —OCONH—, an aryl dioxy or aryl disulphone radical, or a divalent alkyl or aryl radical which may have substituents, for example a halogenated alkyl or aryl radical such as perhalocarbon radical; $R_1$ represents hydrogen or —$COR_3$ where $R_3$ is an alkyl or aryl radical particularly a methyl radical, $R_2$ represents hydrogen, an alkyl radical particularly a lower alkyl radical, an acyl radical such as an acetyl or benzoyl radical or a radical of formula —$CR_4R_5COOR_6$ or the corresponding thio radical where $R_4$, $R_5$ and $R_6$ can each be either hydrogen or a lower alkyl radical. Examples of suitable bis o-amino phenols and bis o-amino thiophenols include 4,4' diamino, 3,3' dihydroxy diphenyl ether; 4,4' dihydroxy 3,3' diamino diphenyl ether; 4,4' dihydroxy 3,3' diamino diphenyl sulphone, 4,6 diamino resorcinol; 3,3' dihydroxy benzidine; 3,3' dimercaptobenzidine and

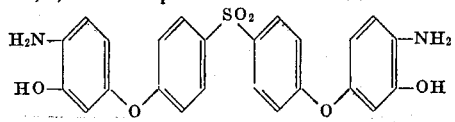

In suitable cases the bis o-amino phenols and bis o-amino thiophenols may be used in the form of their hydrochlorides.

As previously stated the third monomeric component of the polymer composition is a compound of formula:

$$X - Ar - Z$$

where X and Z can be the same or different and represent a hydroxyl, amino or thiol group, and Ar represents an aromatic group such that X and Z are not in ortho or peri relationship. The group Ar may be a substituted or unsubstituted phenyl, naphthyl, or other fused ring system residue but preferably the third monomeric component has the formula:

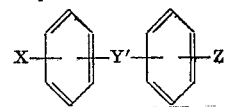

where X and Z are the same or different and represent a hydroyl, amino or thiol group, and Y' represents a carbon-carbon bond or a divalent bridging group. Y' can, for example, be —O—, —S—, —$SO_2$—,

—CONH—, —COO—, —OCONH—, or a divalent alkyl or aryl radical which may be a halogenated alkyl or aryl radical such as a perhalocarbon radical. In such compounds X and Z are preferably substituents in the 4-position and Y' is an oxygen or sulphone linkage. Examples of suitable compounds for use as the third component of the polymer include 4,4' diamino diphenyl ether, 4,4' diamino diphenyl sulphone 4,4' dihydroxy diphenyl ether 4,4' dihydroxy diphenyl sulphone, 4,4' dimercapto diphenyl 4 amino-4'-hydroxy diphenyl and 4 amino-4'-mercapto diphenyl hydrochloride.

The molar proportion of the bis o-amino phenol or bis o-amino thiophenol that can be replaced by the third component of the polymer can be from 1 to 99 percent but is preferably from 5 to 75 percent and particularly from 10 to 50 percent.

The three components of the polymer composition can be reacted together in any desired sequence, but preferably the dibasic acid component is added to a mixture of the other two. The reaction can, if desired, be carried out in a suitable solvent or mixture of solvents. Suitable solvents are often organic liquids such as, for example, dimethylacetamide, pyridine and phenols. Water is preferably excluded from the polymerization reaction system, and the reaction is preferably carried out under vacuum, or in an inert atmosphere.

The reaction conditions will, of course, vary with the components used. Temperatures from 0°C to 100°C are usually suitable if the reaction is carried out in a solvent, although with phenolic solvents higher temperatures may be required. Higher temperatures may also be required if no solvent is present.

As previously stated, the polymers can be converted to benzoxazole or benzthiazole polymers by heating to a suitable temperature. In general, a period of time of about 4 to 6 hours is usually sufficient to effect cyclization, although longer or shorter times can be used in some instances. The heating step should preferably be carried out in an inert atmosphere or under vacuum. Where the polymer composition is derived from a tribasic or tetra-basic carboxylic aromatic acid component, the heat treatment may also give rise to decarboxylation. If desired, the polymer composition can be coated on to a suitable substrate or formed into fibers, films or mouldings prior to the heating step.

The invention is illustrated by the following Examples:

EXAMPLE 1

This Example describes a process for the production of a polymer containing oxy-amide units and its conversion to a polymer containing benzoxazole units.

A solution of 3,3' dihydroxybenzidine (9.73 g) and 4,4' diamino diphenyl ether (1.00 g) in anhydrous dimethylacetamide (70 ml) and anhydrous pyridine (12 ml) under an inert atmosphere is cooled to 0°C and a solution of 4,4' dichloroformyl diphenyl ether (14.76 g) in anhydrous cyclohexanone (70 ml) is added dropwise with stirring over a period of 50 minutes. After further stirring for 3 hours at 0°C the viscous solution is allowed to warm up to room temperature.

The polymer is precipitated as a fine cream powder by means of a suitable diluent such as acetone, methanol, chloroform or water (3 1.). The powder is exhaustively extracted with methanol and ether and the pre-polymer powder dried under vacuum (wt. 20.5 g) inh = 1.0 in dimethylacetamide (30°C).

The pre-polymer is soluble in dimethyl acetamide, dimethyl sulphoxide and tetramethylurea and can be formed as a film or as a thread from these and similar solvents.

After converting to the polybenzoxazole by heating at a temperature between 200° and 450°, preferably 300°, the polymer can be shaped by moulding at 450°C or above.

The cured polymer was of the thermoset nature since the pulverized moulding could not be remoulded without considerable loss in mechanical strength.

Partial curing of the pre-polymer by heating under vacuum or in an inert atmosphere at 250° for short periods (0.5 to 6 hours) provides a partly cured material which can be moulded e.g. at a temperature around 400°C to give mechanically strong mouldings.

Coatings of the pre-polymer or partially cured polymer can be applied to a wide variety of metal, glass, carbon and other surfaces and after full curing at 300° possess good adherent, mechanical, flexible, and thermally stable properties.

The following data are characteristic of the cured polymer;

|  | Cured powder |
|---|---|
| Density (Moulding) | 1.3 |
| Softening Point | 450°C |
| 10% Wt loss (Air) | 560°C |
| 10% Wt loss (Inert gas) | 660°C |
| % Wt loss in Air 16 hours/300°C | 0% |
| Tensile Strength p.s.i. (20°C) (moulding) | 13,000 |
| Flexibility (¼" Bend test) (coating) | pass |

EXAMPLES 2 to 17

Using the same procedures and proportionate quantities of solvents as described above but replacing the monomer components by the compounds listed below, a series of pre-polymers, partially cured and fully cured polymers can be prepared.

| Bis Amino Phenol or Thiophenol Component | Additional Component | Diacid Component |
|---|---|---|
| 2. 4,4' Dihydroxy 3,3' diamino diphenyl ether (10.45 g) | 4,4' Diamino diphenyl ether (1.00 g) | 4,4' Dichloroformyl diphenyl ether (14.76 g) |
| 3. 4,4' Dihydroxy 3,3' diamino diphenyl sulphone (12.61 g) | " (1.00 g) | " (14.76 g) |
| 4. 4,6 Diamino resourcinol (6.3 g) | " (1.00 g) | " (14.76 g) |
| 5. 4,4' Dihydroxy diphenyl (9.73 g) | " (1.00 g) | 4,4' Dichloroformyl diphenyl sulphone (17.16 g) |
| 6. 3,3' Dihydroxy benzidine (9.73 g) | " (1.00 g) | " (17.16 g) |
| 7. 3,3' Dihydroxy benzidine (9.73 g) | 4,4' Dihydroxy diphenyl ether (1.01 g) | 4,4' Dichloroformyl diphenyl ether (14.76 g) |
| 8. " 9.73 g) | 4,4' Diamino diphenyl ether (1.00 g) | 4,4' Dichloroformyl benzophenone (15.36 g) |
| 9. 4,4' Dihydroxy 3,3' diamino diphenyl sulphone (12.61 g) | 4,4' Dihydroxy diphenyl sulphone (1.25 g) | Isophthaloyl dichloride (10.00 g) |
| 10. 4,4' Dihydroxy 3,3' amino diphenyl sulphone (11.93 g) | 4,4' Diamino diphenyl sulphone (1.24 g) | Isophthaloyl dichloride (10.00 g) |
| 11. 3,3' Dihydroxy benzidine (9.73 g) | 4,4' Diamino diphenyl ether (1.00 g) | 4 Chloroformyl Phthalimido-N-benzoyl chloride (17.41 g) |
| 12. 3,3' Dihydroxy benzidine (9.73 g) | 4,4' Diamino diphenyl ether (1.00 g) | 4 Chloroformyl phthalic anhydride (10.57 g) |
| 13. 3,3' Dimercapto benzidine (11.17 g) | 4,4' Diamino diphenyl ether (1.00 g) | Isophthaloyl dichloride (10.00 g) |
| 14. 3,3' Dihydroxy benzidine (10.81 g) diphenyl ether | 4,4' Diamino (10.01 g) | 4,4' Dichloroformyl diphenyl ether (29.51 g) |
| 15. 3,3' Dihydroxy benzidine (10.81 g) | 4,4' Diamino diphenyl ether (10.01 g) | 4,4' Dichloroformyl diphenyl ether (29.51 g) |
| 16. 3,3' Diamino 4,4' Dihydroxy diphenyl sulphone (14.02 g) | 4,4' Diamino diphenyl sulphone (9.91 g) | 4,4' Dichloroformyl diphenyl ether (29.51 g) |
| 17. 3,3' Diamino 4,4' Dihydroxy diphenyl sulphone (18.72 g) | 4,4' Diamino diphenyl ether (13.72 g) | Isophthaloyl chloride (27.13 g) |
| 18. 3,3' Diamino 4,4' Dihydroxy diphenyl sulphone (8.41 g) | 4,4' Dimercapto diphenyl (0.73 g) | 4,4' Dichloroformyl diphenyl ether (7.84 g) |
| 19. 3,3' Diamino 4,4' Dihydroxy diphenyl sulphone (8.41 g) | 4 Amino-4'-hydroxy diphenyl (0.62 g) | 4,4' Dichloroformyl diphenyl ether (7.84 g) |
| 10. 3,3' Diamino 4,4' Dihydroxy diphenyl sulphone (8.41 g) | 4 amino-4'-mercapto diphenyl hydrochloride 0.79 g) | 4,4' dichloroformyl diphenyl ether (7.84 g) |

EXAMPLE 21

The Example describes a process for the production of a polymer containing oxy-amide units without the use of a solvent for the reactants.

A finely ground intimate mixture of diphenyl 4,4′ diphenyl ether dicarboxylate (20.52 g) with 4,4′ diamino diphenyl ether (1.00 g) and 3,3′ dihydroxy benzidine (9.73 g) is heated under an inert atmosphere or under vacuum between 150° and 300°C, preferably at 200°C, until a viscous melt is obtained. The pre-polymer can be powdered by mechanical methods, and may be dissolved in a suitable solvent, from which it may be precipitated or cast as a coating. The polymer possesses properties similar to those described in Example 1, and can be converted to a polymer containing benzoxazole units.

We claim:

1. A process for the production of a polymer which comprises reacting (A) a polybasic carboxylic aromatic acid having a maximum of four carboxylic acid groups or an acid halide, alkyl or phenyl ester or anhydride derivative of such an acid with (B) as a second component a bis o-amino phenol or a bis o-amino thiophenol selected from the group consisting of:

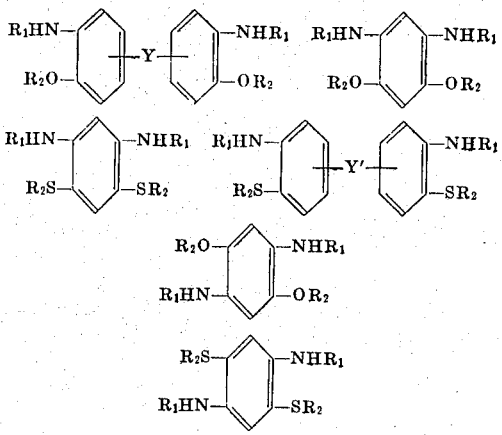

and

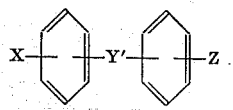

where Y represents a carbon-carbon bond, or a bridging group that is $-O-$, $-S-$, $-SO_2-$, $=C=O$, $-CONH-$, $-COO-$, $-OCONH-$, an aryl dioxy or aryl disulphone radical, or a divalent alkyl or aryl radical; $R_1$ represents hydrogen or $-COR_3$ where $R_3$ is an alkyl or aryl radical, $R_2$ represents hydrogen, an alkyl or acyl radical, or a radical of formula $-CR_4R_5COOR_6$ or the corresponding thio radical, where $R_4$, $R_5$ and $R_6$ can each be either hydrogen or a lower alkyl radical and (C) a third component of formula:

$$X - Ar - Z$$

where X and Z are the same or different and represent a hydroxyl, amino or thiol group, and Ar represents an aromatic group such that X and Z are not in ortho or peri relationship, wherein the second and third components are reacted with the carboxylic acid at a temperature and for a time insufficient to cyclise the resulting polymer, and said third component comprises from 1 to 99 percent of the total moles of second and third component reacted with said polybasic carboxylic aromatic acid.

2. A process according to claim 1, in which the third component is a compound of formula:

where X and Z are the same or different and represent a hydroxyl, amino or thiol group and Y′ represents a carbon-carbon bond or a divalent bridging group that is $-O-$, $-S-$, $-SO_2-=C=O$, $-CONH-$, $-COO-$, $-OCONH-$, a divalent alkyl or aryl radical or a halogenated divalent alkyl or aryl radical.

3. A process for the production of a polymer comprising oxy-amide structural units which can be cyclised by heating, which comprises reacting (A) a polybasic carboxylic aromatic acid having a maximum of four carboxylic acid groups or an acid halide, alkyl or phenyl ester or anhydride derivative of such an acid with (B) as a second component a bis o-amino phenol selected from the group consisting of:

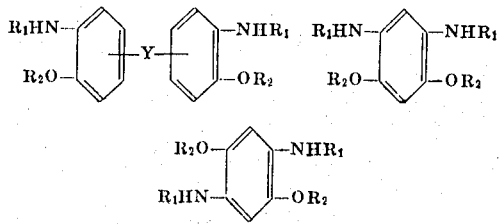

and

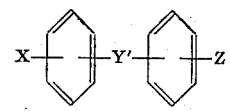

where Y represents a carbon-carbon bond, or a bridging group that is $-O-$, $-S-$, $-SO_2-$, $=C=O$, $-CONH-$, $-COO-$, $-OCONH-$, an aryl dioxy or aryl disulphone radical, or a divalent alkyl or aryl radical; $R_1$ represents hydrogen or $-COR_3$ where $R_3$ is an alkyl or aryl radical; $R_2$ represents hydrogen, an alkyl or acyl radical, or a radical of formula $-CR_4R_5COOR_6$ or the corresponding thio radical, where $R_4$, $R_5$ and $R_6$ can each be either hydrogen or a lower alkyl radical and (C) a third component of formula:

where X and Z are the same or different and represent a hydroxyl amino or thiol group and Y′ represents a carbon-carbon bond or a divalent bridging group that is $-O-$, $-S-$, $-SO_2-$, $=C=O$, $-CONH-$, $-COO-$, $-OCONH-$, a divalent alkyl or aryl radical, or a halogenated divalent alkyl or aryl radical, wherein the second and third components are reacted with the carboxylic acid at a temperature and for a time insufficient to cyclise the resulting polymer, and said third component comprises from 1 to 99 percent of the total moles of second and third component reacted with said polybasic carboxylic aromatic acid.

4. A process according to claim 1, in which the polybasic carboxylic aromatic acid is a dibasic acid.

5. A process according to claim 4, in which the acid is one in which the carboxyl groups are attached to a $-C_6H_4-$, $-C_6H_4-O-C_6H_4-$, $-C_6H_4-SO_2-C_6H_4-$ or $-C_6H_4CO\cdot C_6H_4-$ radical.

6. A process according to claim 1, in which the polybasic carboxylic aromatic acid derivative is isophthaloyl dichloride, terephthaloyl dichloride, 4,4′ dichloroformyl diphenyl ether, 4,4′ dichloroformyl diphenyl sulphone, 4,4′ dichloroformyl benzophenone, pyromellitic acid dianhydride trimellitic acid dianhydride or diphenyl isophthallate.

7. A process according to claim 1, in which the bis o-amino phenol is 4,4′ diamino 3,3′ dihydroxy diphenyl ether; 4,4′ dihydroxy 3,3′ diamino diphenyl ether; 4,4′ dihydroxy 3,3′ diamino diphenyl sulphone, 4,6 diamino resorcinol; 3,3′ dihydroxy benzidine or

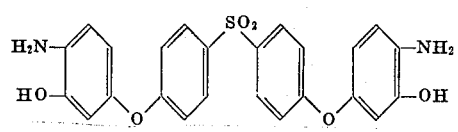

8. A process according to claim 1, in which the bis o-amino thiophenol is 3,3′ dimercaptobenzidine.

9. A process according to claim 1, in which the bis o-amino phenol or bis o-amino thiophenol is used in the form of its hydrochloride.

10. A process according to claim 2, in which X and Z are substituents in the 4-position and Y' is an oxygen or sulphone linkage.

11. A process according to claim 2, in which the compound is 4,4' diamino diphenyl ether, 4,4' dihydroxy diphenyl ether 4,4' dihydroxy diphenyl sulphone, 4,4' diamino diphenyl sulphone, 4,4' dimercapto diphenyl, 4 amino-4'-hydroxy diphenyl, or 4-amino-4'-mercapto diphenyl hydrochloride.

12. A process according to claim 1, in which the amount of third component present is from 5 to 75 molar percent of the bis o-amino phenol or bis o-amino thiophenol.

13. A process according to claim 1, which is carried out in an inert solvent.

14. A process according to claim 13, in which the solvent is dimethyl acetamide, pyridine or a phenol.

15. A process according to claim 1, that is carried out under vacuum or an inert atmosphere.

16. A process according to claim 1, that is carried out at a temperature from 0°C to 100°C.

17. A process according to claim 1, in which the polymer composition is subsequently heated to effect cyclisation of the cyclisable structural units.

18. A process according to claim 17, in which the polymer composition is heated to a temperature of from 250°C to 450°C.

19. A process according to claim 18, that is carried out in an inert atmosphere or under vacuum.

20. A process according to claim 17, in which the polymer composition is coated on to a substrate prior to the heating step.

21. The process according to claim 17, in which the polymer composition is formed into a fiber prior to the heating step.

22. The process according to claim 17, in which the polymer composition is formed into a film prior to the heating step.

23. The process according to claim 17, in which the polymer composition is formed into a moulding prior to the heating step.

24. A polymer containing benzoxazole or benzthiazole structural units that has been produced by a process according to claim 17.

25. An aromatic polyamide polymer having oxy- or thio- groups in ortho or peri relationship to the amide structural units which can be cyclised to form benzoxazole or benzthiazole structural units by heating, and —CONH—, —CO.O— or —CO.S structural units which are not able to cyclise at the temperature at which the benzoxazole or benzthiazole units are formed obtainable by the method of claim 1.

26. A polymer comprising oxy-amide structural units which are capable of being cyclised by heating and which also comprises —CONH—, —CO.O—, or —CO.S— structural units which are not able to cyclise at the temperature of cyclisation of the oxy-amide units obtainable by the method of claim 1.

27. A polymer according to claim 25, wherein the third component comprises from 5 to 75 percent of the total moles of second and third component reacted with the polycarboxylic acid.

28. A polymer according to claim 25, that has been coated on to a substrate.

29. A polymer according to claim 25, that has been formed into a fiber.

30. A polymer according to claim 25 that has been formed into a film.

31. A polymer according to claim 25 that has been formed into a moulding.

* * * * *